J. ANDERSON.
Sun-Bonnets for Horses.
No. 139,491.
Patented June 3, 1873.
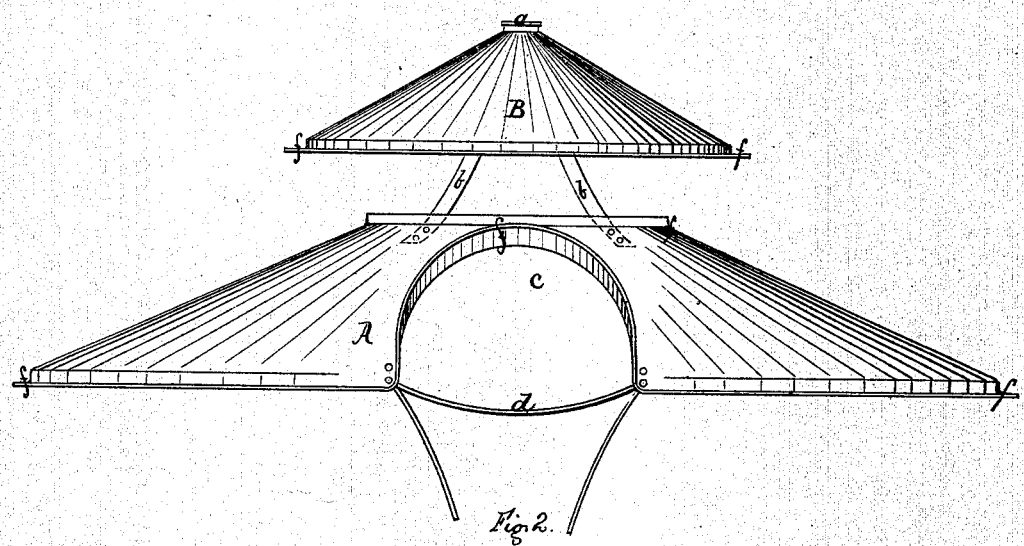
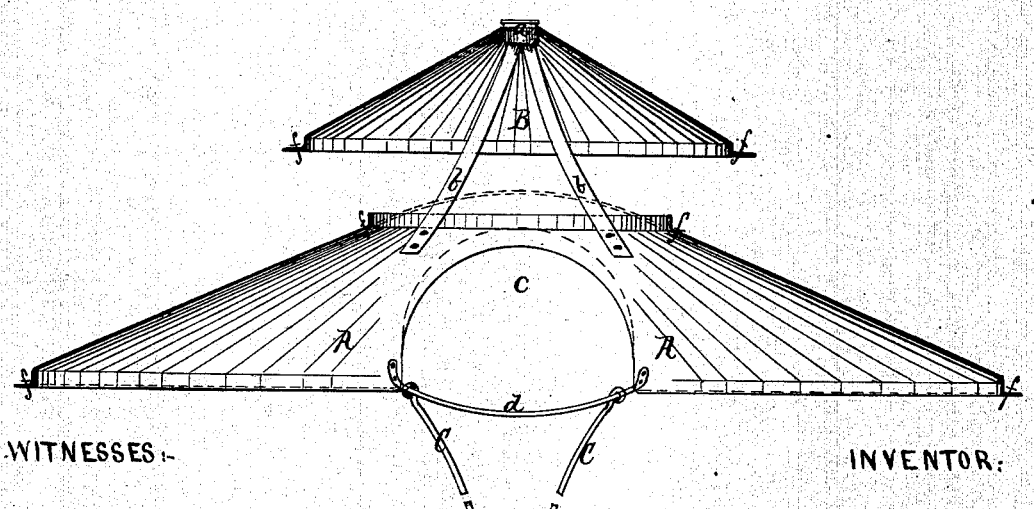

UNITED STATES PATENT OFFICE.

JOHN ANDERSON, OF BROOKLYN, NEW YORK.

IMPROVEMENT IN SUN-BONNETS FOR HORSES.

Specification forming part of Letters Patent No. 139,491, dated June 3, 1873; application filed March 25, 1873.

*To all whom it may concern:*

Be it known that I, JOHN ANDERSON, of the city of Brooklyn, in the county of Kings and State of New York, have invented a new and Improved Sun-Bonnet for Horses; and I hereby declare that the following is a full, clear, and exact description of the same, reference being had to the accompanying drawing which forms part of this specification:

Before the date of my present invention several devices existed for shielding a horse's head from the direct rays of the sun, and for keeping the same cool. I will first refer to a style of horse-bonnet found described in United States Letters Patent, No. 58,081, September 18, 1866, where two flat pieces of leather, cut of a shape to rest upon the skull of the horse, were stitched together around the edges so as to form a receptacle for bran or similar material, and provided with a water-vessel, with a wick to convey water to the bran for keeping the same moist. This device was designed to rest directly upon the skull of the horse; and it was provided with straps for fastening it to the bridle, so that it should lie close upon the horse's head between his ears. This device would not permit any ventilation of the horse's head beneath it, and would act as a plaster, growing hotter and hotter, not only by heat from the sun, but by the heat of the animal wearing it, until it became more of an injury than a benefit.

Another style of horse sun-bonnet is found described in the United States Letters Patent, No. 81,412, August 25, 1868. Here a canopy of suitable fabric is stitched over a folding-frame, and is elevated, by attachment to the bridle, above the horse's head and body, so as to obstruct the direct rays of the sun from reaching the horse's head and body, and at the same time permit a circulation of air between the canopy and the horse's head and body. This device, with its folding arms running in all directions and covering the whole body of the horse, was quite complicated; so much so as to greatly impair its practical value.

Another style of horse sun-bonnet is found described in United States Letters Patent, No. 92,142, granted to me July 6, 1869. This patent shows a wire-frame of a suitable size to extend over the horse's head, said frame being covered with some suitable fabric; the whole device being supported above the horse's head by attachment to the bridle, so that the air could freely circulate between the bonnet and the horse's head. This latter sun-bonnet is a good and efficient device, and has gone into general use, but it is expensive to manufacture. The wire-frame must be first constructed, principally by hand, and then this frame has to be covered with the fabric, principally by hand.

The object of my present invention is to produce a sun-bonnet for horses which can be cheaply made, which is light, and which will afford an ample protection to the head from the direct rays of the sun, and at the same time allow a free circulation of air between it and the horse's head; to such end my invention consists in the new article of manufacture of a sun-bonnet for horses, constructed of any suitable material of sufficient strength to preserve its proper shape; such bonnet having ear-holes at each side to allow the horse's ears to project through in the usual way, and always provided with a suitable fastening at each side for securing it above the horse's head, in an elevated position.

In the accompanying drawing, Figure 1 is a side elevation of a sun-bonnet for horses, showing my present invention. Fig. 2 is a vertical central section of the same.

A designates the body of the bonnet, which may be of any suitable form or shape. The said body A is shown, as provided, with an opening at its apex or top, over which is elevated a canopy, B, which is fitted to revolve upon or with a pintle, $a$, attached to supporting-rods $b$, extending upward from the said body. The body is provided with an ear-hole, $c$, one on each side; and it is also preferably provided with a guard-wire, $d$, on each side, which wires complete the boundaries of the said ear-holes. The canopy B is a desirable feature. C D E F G is the device employed, in the present instance, for fastening the bonnet to the bridle of the horse. The outer ends of the arms C are attached to the guard-wire $d$, but may be attached directly to the body of the bonnet on respective sides of the ear-holes. D is a cross connection, and E are coils at the upper part of the legs F; the coils permit the legs to be moved nearer together, or further apart, as desired. These legs are designed to be inserted through a loop on the check-strap of the bridle, and the spring-slide G is to be slid down to keep the legs apart when so inserted. For the purpose of my present invention the form or shape of the bonnet is immaterial—it may be a body, A, and a canopy, B, or a body of the form or shape shown in my patent of July 19, 1871, or a body of any other suitable shape or form. My object, as I have before stated, is to dispense with the use of wire or other frames covered with fabric, as at present, so as to lessen the cost of manufacture, and at the same time produce a thoroughly efficient and reliable horse-bonnet. To effect this I construct the body of the bonnet of any suitable material of a sufficient strength to preserve its proper shape when subjected to any ordinary handling or use. In the present instance I have shown the body (as well as the canopy) constructed of paper or paste-board, which is a good non-conductor of heat. Its exterior is preferably rendered water-proof by varnish or otherwise. To increase the strength of the body and protect its edges from tearing I form a corrugation, $f$, one or more, around the edges of the bonnet; but I will remark that metal may be used in various ways for strengthening the edges. The whole body of the bonnet, whether made of paste-board or of paper-pulp pressed into shape in molds, or of other suitable material, may be corrugated and ornamented with designs, fringing, tassels, &c.

From the foregoing description it will be seen that I produce, as a new article of manufacture, a sun-bonnet for horses wherein the usual metal or other frame is not employed, one which is cheap, light, strong, and thoroughly efficient in all respects; it will also be seen that I combine, with the body proper of such a bonnet, a revolving canopy, which is a new and useful feature in a horse sun-bonnet; it will also be seen that I combine, with the body of the bonnet, a new kind of fastening for securing it to the bridle so that it shall maintain an elevated position.

What I claim as my invention, and desire to secure by Letters Patent, is—

1. The new article of manufacture of an elevated sun-bonnet for horses, the body of which is composed of a suitable material having sufficient strength to retain its proper form or shape without the use of the wire or other frame heretofore employed, and strengthened at the edges, substantially as herein specified.

2. The combination with the body A of the fastening C D E F G for securing the bonnet to the bridle of the horse in an elevated position, substantially as herein specified.

JOHN ANDERSON.

Witnesses:
M. M. LIVINGSTON,
T. B. BEECHER.